(12) United States Patent
Zhao et al.

(10) Patent No.: US 12,221,372 B2
(45) Date of Patent: Feb. 11, 2025

(54) MOLD FOR MOLDING GLASS PRODUCT

(71) Applicant: AAC Optics (Chongqing) Co., Ltd., Chongqing (CN)

(72) Inventors: Linzhi Zhao, Shenzhen (CN); Jian Wang, Shenzhen (CN)

(73) Assignee: AAC Optics (Chongqing) Co., Ltd., Chongqing (CN)

(*) Notice: Subject to any disclaimer, the term of this patent is extended or adjusted under 35 U.S.C. 154(b) by 269 days.

(21) Appl. No.: 18/088,638

(22) Filed: Dec. 26, 2022

(65) Prior Publication Data

US 2024/0059598 A1    Feb. 22, 2024

Related U.S. Application Data

(63) Continuation of application No. PCT/CN2022/119108, filed on Sep. 15, 2022.

(30) Foreign Application Priority Data

Aug. 18, 2022 (CN) .......................... 202222174273.0

(51) Int. Cl.
    *C03B 11/08*          (2006.01)
    *C03B 23/03*          (2006.01)

(52) U.S. Cl.
    CPC .......... *C03B 11/08* (2013.01); *C03B 23/0302* (2013.01); *C03B 2215/03* (2013.01); *C03B 2215/46* (2013.01)

(58) Field of Classification Search
CPC ... B29C 43/021; C03B 11/08; C03B 23/0302; C03B 3/00; C03B 2215/50; C03B 2215/68
See application file for complete search history.

(56) References Cited

U.S. PATENT DOCUMENTS

2005/0254254 A1* 11/2005 Moseler ................ F21S 41/275
                                             362/520
2006/0001963 A1* 1/2006 Ishikawa .................. G02B 3/08
                                             359/457

(Continued)

FOREIGN PATENT DOCUMENTS

CN           101492236 A  *   7/2009
JP         2003026431 A  *   1/2003  ........... C03B 11/088

(Continued)

*Primary Examiner* — Erin Snelting
*Assistant Examiner* — Steven S Lee
(74) *Attorney, Agent, or Firm* — W&G Law Group

(57) ABSTRACT

A mold for molding a glass product is provided. The mold includes a lower mold and an upper mold. The lower mold includes a lower pressing surface. The upper mold includes an upper pressing surface. The upper pressing surface includes a plurality of upper molding surfaces and an upper mold closing surface connecting the plurality of upper molding surfaces. The lower pressing surface includes a plurality of lower molding surfaces and a lower mold closing surface for connecting the plurality of lower molding surfaces. The upper mold closing surface and/or the lower mold closing surface include at least two mold closing regions sequentially arranged from center to outside. The at least two mold closing regions have surface roughnesses increasing from center to outside. The disclosure achieves the technical effect of even filling, synchronous demoulding, and reduced error between mold cavities.

12 Claims, 4 Drawing Sheets

(56) References Cited

U.S. PATENT DOCUMENTS

| | | | | |
|---|---|---|---|---|
| 2010/0290123 A1* | 11/2010 | Yamada | ............... | G02B 3/0056 |
| | | | | 264/2.7 |
| 2012/0057100 A1* | 3/2012 | Masuda | ................. | G02B 5/045 |
| | | | | 359/619 |
| 2017/0297944 A1* | 10/2017 | Yea | ..................... | C03B 23/0302 |

FOREIGN PATENT DOCUMENTS

| | | | | |
|---|---|---|---|---|
| JP | 4102585 B2 * | 6/2008 | ............. | C03B 11/08 |
| JP | 2009269762 A * | 11/2009 | ........... | C03B 11/088 |
| JP | 2009292690 A * | 12/2009 | ........... | C03B 11/082 |
| WO | WO-2015137026 A1 * | 9/2015 | ............. | G02B 7/003 |
| WO | WO-2021103079 A1 * | 6/2021 | ........... | G02B 3/0025 |

\* cited by examiner

MOLD FOR MOLDING GLASS PRODUCT

CROSS REFERENCE TO RELATED APPLICATIONS

The present application is a continuation of PCT Patent Application No. PCT/CN2022/119108, filed Sep. 15, 2022, which claims priority to Chinese patent application No. 202222174273.0, filed Aug. 18, 2022, each of which is incorporated by reference herein in its entirety.

TECHNICAL FIELD

The disclosure relates to the field of optical technologies, in particular, to a mold for molding a glass product.

BACKGROUND

A lens is an optical element made from transparent materials such as glass and plastic. The lens is widely applied to digital cameras, laser, optical instrument, and other fields. With development in the Internet era, electronic devices are increasingly used in people's lives and therefore there is a growing demand to electronic products to which lenses are applied.

Currently, in existing optical technologies, the lens is produced through thermoforming by using a glass processing mold. After the glass processing mold is closed, a mold body may define a space having a preset shape. The space is used to define a shape of a glass material being heated, and then the glass material is cooled to form a glass product having the preset shape. However, there may be uneven filling within the mold. It is relatively easier to be filled at the center than the periphery of the mold. In this way, the glass material on the periphery of the mold may be easily released from the mold than that at the center of the mold. That is, a demoulding time of the glass material on the periphery of the mold differs from that at the center of the mold, resulting in a relatively large error between mold cavities.

As such, uneven filling, inconsistent demoulding time, and a relatively large error between mold cavities exist in existing optical technologies.

SUMMARY

The disclosure aims to solve the technical problems of uneven filling, asynchronous demoulding, and a relatively large error between mold cavities.

In order to address the technical problems described above, the disclosure provides a mold for molding a glass product. The mold includes a lower mold and an upper mold matching the lower mold. The lower mold includes a lower pressing surface provided close to the upper mold. The upper mold includes an upper pressing surface provided close to the lower pressing surface. The upper pressing surface includes a plurality of upper molding surfaces for molding the glass product and an upper mold closing surface connecting the plurality of upper molding surfaces. The lower pressing surface includes a plurality of lower molding surfaces for molding the glass product and a lower mold closing surface for connecting the plurality of lower molding surfaces. The upper mold closing surface and/or the lower mold closing surface include at least two mold closing regions sequentially arranged from center to outside. The at least two mold closing regions have surface roughnesses increasing from the center to the outside.

Further, the at least two mold closing regions include a central mold closing region at the a center and at least one extending mold closing region extending outward from the central mold closing region. The central mold closing region has a circular shape, and an extending mold closing region has a ring shape.

Further, the at least two mold closing regions include a central mold closing region at the a center and at least one extending mold closing region extending outward from the central mold closing region. The central mold closing region has a rectangular shape, and an extending mold closing region has a rectangular-ring shape.

Further, a surface roughness of an outermost extending mold closing region of the at least one extending mold closing region is 40 nm to 100 nm.

Further, each of the plurality of upper molding surfaces comprises an optical molding surface for molding an effective optical diameter and a structure molding surface surrounding the optical molding surface, and each of the plurality of lower molding surfaces comprises an optical molding surface for molding an effective optical diameter and a structure molding surface surrounding the optical molding surface. A surface roughness of a respective structure molding surface is less than a corresponding surface roughness of a mold closing region connected to the respective structure molding surface.

Further, the surface roughness of the respective structure molding surface is less than 20 nm.

Further, each of the plurality of upper molding surfaces comprises an optical molding surface for molding an effective optical diameter and a structure molding surfaces surrounding the optical molding surface, and each of the plurality of lower molding surfaces comprises an optical molding surface for molding an effective optical diameter and a structure molding surface surrounding the optical molding surface. A surface roughness of a respective structure molding surface is equal to a corresponding surface roughness of a mold closing region connected to the respective structure molding surface.

Further, a center of each of the at least one extending mold closing region is the same as a center of the central mold closing region.

The disclosure has following advantageous effects.

The disclosure provides a mold for molding a glass product. The lower pressing surface close to the upper mold is provided in the lower mode. An upper pressing surface close to the lower pressing surface is provided in the upper mold. The upper pressing surface includes the plurality of upper molding surfaces for molding the glass product and the upper mold closing surface connecting the plurality of upper molding surfaces. The lower pressing surface includes the plurality of lower molding surfaces for molding the glass product and the lower mold closing surface for connecting the plurality of lower molding surfaces. The upper mold closing surface and/or the lower mold closing surface include(s) at least two mold closing regions sequentially arranged from the center to the outside. The at least two mold closing regions have surface roughnesses increasing from the center to the outside. In this way, the roughness from the center to the periphery of the mold can gradually increase, which can improve a filling effect on the periphery of the mold, achieve synchronous demoulding, and reduce an error between mold cavities. Therefore, the technical effect of even filling, synchronous demoulding and reduction of the error between mold cavities can be achieved.

BRIEF DESCRIPTION OF DRAWINGS

In order to illustrate the technical solutions in the embodiments of the disclosure or in the existing technologies more clearly, the drawings used in the description of the embodiments will be briefly described below. It is obvious that the drawings in the following description are only some embodiments of the disclosure. For those skilled in the art, other drawings may also be obtained in accordance with the drawings without any inventive effort.

DETAILED DESCRIPTION OF EMBODIMENTS

Figure 1:
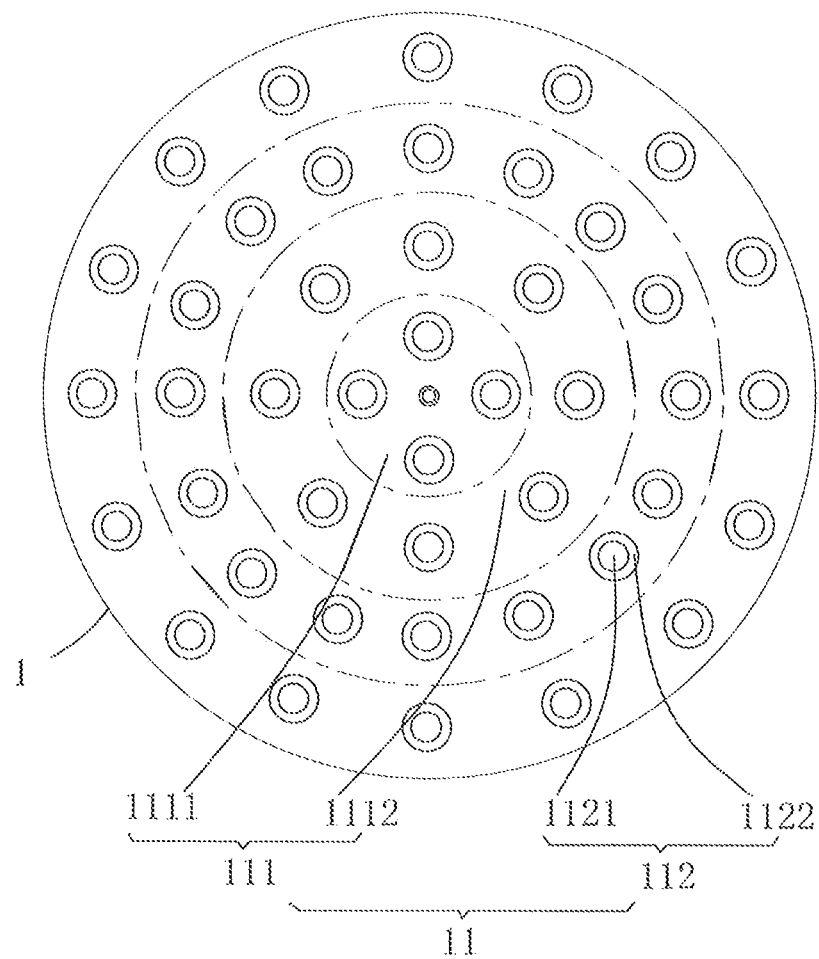
FIG. 1 is a schematic structural diagram of a lower mold in a mold for molding a glass product according to embodiments of the disclosure.

Technical solutions in embodiments of the disclosure may be described with reference to the drawings for the embodiments of the disclosure more clearly and completely. Obviously, the embodiments described are only some embodiments rather than all embodiments of the disclosure. On the basis of the embodiments of the disclosure, all the other embodiments obtained by those skilled in the art fall into the scope of the disclosure. The key term of "and/or" in the disclosure presents two conditions, "and" and "or". That is, the expression "A and/or B" disclosed in the disclosure represents two conditions "A and B" and "A or B". The expression "A and/or B" describes three status: only A is included, only B is included, and both A and B are included.

It would be appreciated that although terms "first", "second" and the like herein may be used to describe different elements, components, regions, layers, and/or portions, these elements, components, regions, layers, and/or portions should not be limited by these terms. The terms are only used for distinguish one element, component, region, layer, or portion from another element, component, region, layer, or portion. Therefore, without departing from the teaching of the exemplary embodiments, a first element, component, region, layer, or portion described in the following may be also called as a second element, component, region, layer, or portion. Herein, space terms such as "lower" and "upper" may be used, in order to describe a relationship between one element or feature and another element or feature. It may be appreciated that besides the locations shown in the drawings, space terms further include directions of devices during use or operation. For example, if a device in the drawings is reverted, an element or feature referred to as "lower" would be taken as "upper" element or feature. Therefore, the exemplary term "lower" may include the upper and lower directions. The device may be relocated (be rotated by 90 degrees or in another direction), and a reference sign for space description may be described accordingly.

In addition, in the disclosure, if a component is considered to be "fixed to" another component, the component may be directly disposed on the another component or there may be a middle component between them. If a component is considered to be "connected" to another component, the component may be directly connected to the another component or there may be a middle component between them. If a component is considered to be "provided on" another component, the component may be directly provided on the another component or there may be a middle component between them. Terms such as "vertical", "horizontal", "left", "right" used in the embodiments in the disclosure are merely intended to describe the disclosure rather than limit the disclosure.

Figure 2:
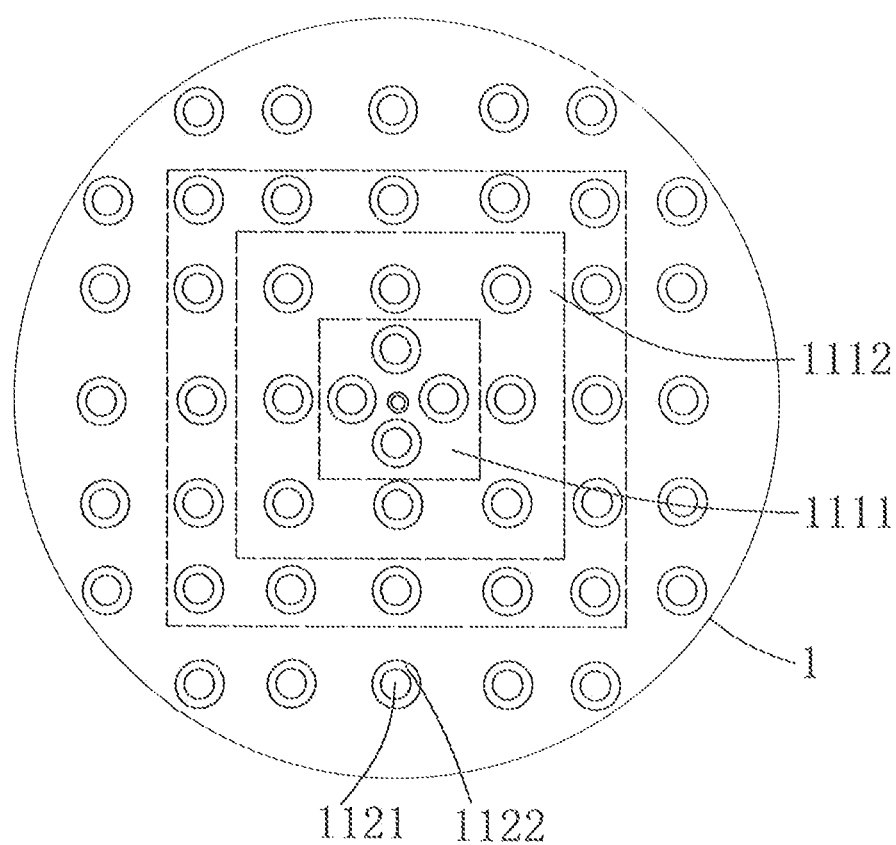
FIG. 2 is a schematic structural diagram of a lower mold in a mold for molding a glass product according to other embodiments of the disclosure.
Figure 3:
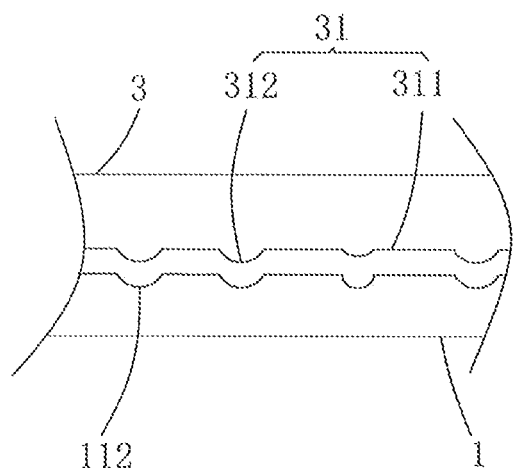
FIG. 3 is a partial structural diagram of an upper mold and a lower mold in a mold for molding a glass product according to embodiments of the disclosure.
Figure 4:
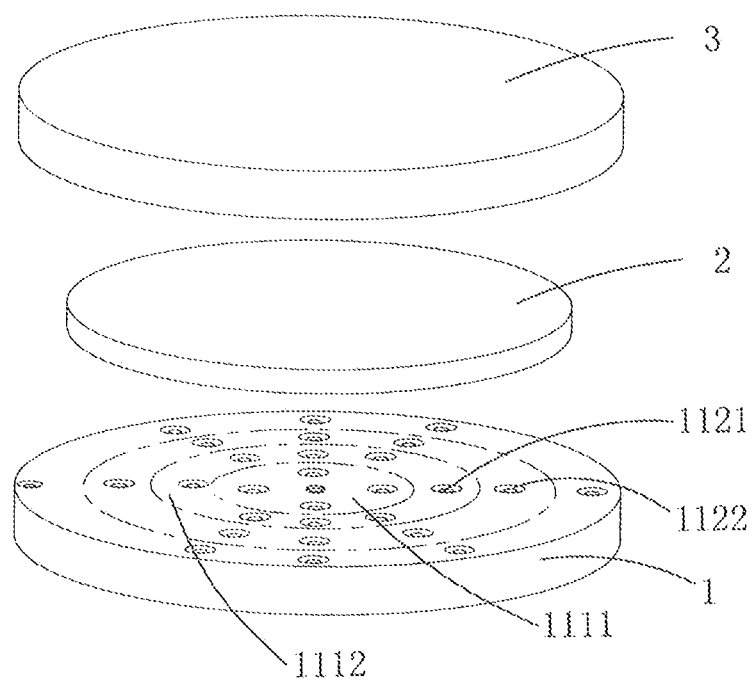
FIG. 4 is a schematic structural diagram of a mold for molding a glass product according to embodiments of the disclosure.

Refer to FIGS. 1 to 4. FIG. 1 is a schematic structural diagram of a lower mold 1 in a mold for molding a glass product according to embodiments of the disclosure. FIG. 2 is a schematic structural diagram of a lower mold 1 in a mold for molding a glass product according to other embodiments of the disclosure. FIG. 3 is a partial structural diagram of an upper mold 3 and a lower mold 1 in a mold for molding a glass product according to embodiments of the disclosure. FIG. 4 is a schematic structural diagram of a mold for molding a glass product according to embodiments of the disclosure. Embodiments of the disclosure provide a mold for molding a glass product. The mold includes a lower mold 1 and an upper mold 3 cooperated with (corresponding to) the lower mold 1. The lower mold 1 and the upper mold 3 are specifically described as follows.

For the lower mold 1 and the upper mold 3, the lower mold 1 includes a lower pressing surface 11 provided close to the upper mold 3, and the lower pressing surface 11 includes a plurality of lower molding surfaces 112 for molding a glass product and a lower mold closing surface 111 for connecting the plurality of lower molding surfaces 112. The upper mold 3 includes an upper pressing surface 31 provided close to the lower pressing surface 11. A plurality of upper molding surfaces 312 for molding the glass product and an upper mold closing surface 311 connecting the plurality of upper molding surfaces 312 may form the upper pressing surface 31. The upper mold closing surface 311 and/or the lower mold closing surface 111 include(s) at least two mold closing regions sequentially arranged from center to outside, and surface roughnesses of the at least two mold closing regions increase from the center to the outside. In some embodiments, the at least two mold closing regions include a central mold closing region 1111 located at center and at least one extending mold closing region 1112 extending outward from the central mold closing region 1111. The central mold closing region 1111 has a circular shape, and each of the at least one extending mold closing region 1112 has a ring shape. In other embodiments, the at least two mold closing regions include a central mold closing region 1111 located at the center and at least one extending mold closing region 1112 extending outward from the central mold closing region 1111. The central mold closing region 1111 has a rectangular shape, and each of the at least one extending mold closing region 1112 has a rectangular-ring shape. A surface roughness of an outermost extending mold closing region of the at least one extending mold closing region 1112 is 40 nm to 100 nm.

In particular, the plurality of lower molding surfaces 112 may refer to one lower molding surface 112, two lower molding surfaces 112, or three lower molding surfaces 112, or the like. The lower mold closing surface 111 is connected with the plurality of lower molding surfaces 112. The plurality of lower molding surfaces 112 and the lower mold closing surface 111 connected with the plurality of lower molding surfaces 112 form the lower pressing surface 11. A central mold closing region 1111 is provided at the center of the lower mold closing surface 111. A plurality of extending mold closing regions 1112 may be provided in a direction close to an edge of the lower mold 1 from the central mold closing region 1111. The plurality of extending mold closing regions 1112 may refer to one extending mold closing region 1112, two extending mold closing regions 1112, three extending mold closing regions 1112, or the like.

Referring back to FIG. 1, as an implementation of the mold for molding a glass product according to the disclosure, the central mold closing region 1111 located at the center of the lower mold closing surface 111 may be in a shape of a circle, and the plurality of extending mold closing regions 1112 each may be in a shape of a ring. A center of each of the plurality of extending mold closing regions 1112 in a shape of a ring is the same as a center of the central mold closing region 1111. In this way, more optical molding surfaces 1121 for molding an effective optical diameter and structure molding surfaces 1122 each surrounding a corresponding optical molding surface may be provided on the lower pressing surface. As a result, surface space of the lower pressing surface 11 is more efficiently utilized, which is advantageous for improvement of the utilization ratio of a glass material 2. In one example, when the plurality of extending mold closing regions 1112 each having a ring shape are configured as three extending mold closing regions 1112, the three extending mold closing regions 1112 respectively refer to a first extending mold closing region 1112, a second extending mold closing region 1112, and a third extending mold closing region 1112. The first extending mold closing region 1112, the second extending mold closing region 1112, and the third extending mold closing region 1112 are sequentially arranged away from the central mold closing region 1111. That is, the central mold closing region 1111 is adjacent to the first extending mold closing region 1112, the first extending mold closing region 1112 is adjacent to the second extending mold closing region 1112, and the second extending mold closing region 1112 is adjacent to the third extending mold closing region 1112. The surface roughness refers to a small distance between micro peaks or valleys (i.e., unevenness of the peaks and valleys) on a processed surface. A smaller distance between two peaks or two valleys leads to a less surface roughness and a smoother surface. On the contrary, a greater distance between two peaks or two valleys leads to a greater surface roughness and a rougher surface. In this embodiment, the surface roughness refers to Ra, a measuring instrument to measure surface roughness is ZYGO®. If a surface roughness of the central mold closing region 1111 is A1, a surface roughness of the first extending mold closing region 1112 is A2, a surface roughness of the second extending mold closing region 1112 is A3, and a surface roughness of the third extending mold closing region 1112 is A4, a surface roughness may be changed by forming metal plastic deformation through friction between a cutting tool and the surface of the lower mold closing surface 111. For example, the surface roughness of the third extending mold closing region 1112 may be 40 nm to 100 nm, i.e., 40 nm≤A4≤100 nm. By forming varied regions that differ in terms of depth, density, shape, and texture of tracks formed on the surface of the lower mold closing surface 111, the central mold closing region 1111, the first extending mold closing region 1112, the second extending mold closing region 1112, and the third extending mold closing region 1112 are formed on the lower mold closing surface 111 by processing to cause A1<A2<A3<A4. As a result, surface roughnesses from the center of the lower mold closing surface 111 to the outside gradually increase, such that a filling effect on the periphery of the mold may be improved, demoulding is achieved synchronously, and a relatively error between mold cavities is reduced.

Referring back to FIG. 2, as another implementation of the mold for molding a glass product according to the disclosure, the central mold closing region 1111 located at the center of the lower mold closing surface 111 may be in a shape of a rectangle, and the plurality of extending mold closing regions 1112 each may have a rectangular-ring shape. A center of each of the plurality of extending mold closing regions 1112 each having a rectangular-ring shape are the same as a center of the central mold closing region 1111. The central mold closing region 1111 having a rectangular shape and the plurality of extending mold closing regions 1112 each having the rectangular-rings shape can leave rectangular prints (marks) on the glass material 2. After the glass material 2 is formed, it is convenient for a formed glass material 2 to be cut into rectangles and for each rectangular glass material 2 to be further cut. This is advantageous for improving convenience of cutting. In one example, if the plurality of extending mold closing regions 1112 each having a rectangular-ring shape are configured as three extending mold closing regions 1112, the three extending mold closing regions 1112 may respectively refer to a fourth extending mold closing region 1112, a fifth extending mold closing region 1112, and a sixth extending mold closing region 1112. The fourth extending mold closing region 1112, the fifth extending mold closing region 1112, and the sixth extending mold closing region 1112 are distributed sequentially away from the central mold closing region 1111. That is, the central mold closing region 1111 is adjacent to the fourth extending mold closing region 1112, the fourth extending mold closing region 1112 is adjacent to the fifth extending mold closing region 1112, and the fifth extending mold closing region 1112 is adjacent to the sixth extending mold closing region 1112. In one example, when a surface roughness of the central mold closing region 1111 is A5, a surface roughness of the fourth extending mold closing region 1112 is A6, a surface roughness of the fifth extending mold closing region 1112 is A7, and a surface roughness of the sixth extending mold closing region 1112 is A8, in this case, A5<A6<A7<A8. As a result, the surface roughnesses from the center of the lower mold closing surface 111 to the outside gradually increase such that a filling effect on the periphery of the mold may be improved, demoulding is achieved synchronously, and a relatively error between mold cavities is reduced.

In one example, the upper pressing surface 31 opposite to the lower pressing surface 11 is provided in the upper mold 3. There is a space for accommodating the glass material 2 between the upper pressing surface 31 and the lower pressing surface 11. The upper molding surfaces 312 provided in the upper pressing surface 31 have a same structure and is achieved with a same principle as the lower molding surfaces 112 provided in the lower pressing surface 11 and thus are not repeated herein. The upper mold closing surface 311 provided in the upper pressing surface 31 have a same structure and is achieved with a same principle as the lower mold closing surface 111 provided in the lower pressing surface 11 and thus is not repeated. In addition, in order to specifically describe arrangement of the central mold closing region 1111 and the at least one extending mold closing region 1112, the upper mold 3 and the lower mode 1 in the mold for molding a glass product provided in the embodiments of the disclosure may be any one of the following implementations. A central mold closing region 1111 and at least one extending mold closing region 1112 are provided in the upper mold 3 so that in the upper mold 3, a surface roughness from the center of the upper mold closing surface 311 to the outside gradually increases. Alternatively, the central mold closing region 1111 and the at least one extending mold closing region 1112 are provided in the lower mold 1 so that in the lower mold 1, the surface roughness from the center of the lower mold closing surface 111 to the outside gradually increases. Alternatively, both the upper mold 3 and the lower mold 1 include the central mold closing region 1111 and the at least one extending mold closing region 1112, so that in the upper mold 3, the surface roughness from the center of the upper mold closing surface 311 to the outside gradually increases, and in the lower mold 1, the surface roughness from the center of the lower mold closing surface 111 to the outside gradually increases.

It is to be noted that each of the plurality of upper molding surfaces 312 includes an optical molding surface 1121 for molding an effective optical diameter and a structure molding surface 1122 surrounding the optical molding surface 1121, and each of the plurality of lower molding surfaces 112 includes an optical molding surface 1121 for molding an effective optical diameter and a structure molding surface 1122 surrounding the optical molding surface 1121. Each optical molding surface 1121 may have a concave shape. The optical molding surface 1121 may have another shape as desired. In a case where each optical molding surface 1121 is displayed as concave, a corresponding structure molding surface 1122 may be distributed as a ring around the center of the optical molding surface 1121. For example, the structure molding surface 1122 and the optical molding surface 1121 cooperatively define a groove. The optical molding surface 1121 is connected with a surface of the mold closing region through the structure molding surface 1122. A surface roughness of the structure molding surface 1122 is less than a surface roughness of the mold closing region connected with the structure molding surface 1122. The surface roughness of the structure molding surface 1122 is less than 20 nm. Each of the plurality of upper molding surfaces 312 includes an optical molding surface 1121 for molding an effective optical diameter and a structure molding surface 1122 surrounding the optical molding surface 1121, and each of the plurality of lower molding surfaces 112 includes an optical molding surface 1121 for molding an effective optical diameter and a structure molding surface 1122 surrounding the optical molding surface 1121. On condition that a surface roughness of the structure molding surface 1122 changes with a surface roughness of a mold closing region connected with the structure molding surface 1122, if the structure molding surface 1122 is located in the first extending mold closing region 1112, and the surface roughness of the structure molding surface 1122 is A9, there may be A9<A2 and A9<20 nm, or A9=A2. If the surface roughness of the structure molding surface 1122 maintains unchanged, there may be A9<20 nm. In this way, surface roughnesses in a direction of the optical molding surface 1121, the structure molding surface 1122, and the first extending mold closing region 1112 sequentially increase, which is advantageous for improving a filling effect on the periphery of the mold, achieving synchronous demoulding, and reducing a error between mold cavities.

In the disclosure, in the mold for molding a glass product, the lower pressing surface 11 close to the upper mold 3 is provided in the lower mode 1, and the upper pressing surface 31 close to the lower pressing surface 11 is provided in the upper mold 3. The upper pressing surface 31 includes the plurality of upper molding surfaces 312 for molding the glass product and the upper mold closing surface 311 connecting the plurality of upper molding surfaces 312. The lower pressing surface 11 includes the plurality of lower molding surfaces 112 for molding the glass product and the lower mold closing surface 111 for connecting the plurality of lower molding surfaces 112. The upper mold closing surface 311 and/or the lower mold closing surface 111 include(s) at least two mold closing regions sequentially arranged from the center to the outside. The at least two mold closing regions have surface roughnesses increasing from the center to the outside. In this way, the roughness from the center to the periphery of the mold can gradually increase, which can improve a filling effect on the periphery of the mold, achieve synchronous demoulding, and reduce an error between mold cavities. Therefore, the technical effect of even filling, synchronous demoulding and reduction of the error between mold cavities can be achieved.

It shall be noted that the above implementations are only for describing rather than limiting the technical solutions in the disclosure. Although the disclosure is specifically described with reference to examples, those of ordinary skilled shall understand that the technical solution in the disclosure may be amended or equivalently substituted without going beyond the spirit and scope of the technical solution in the disclosure, but the technical solution in the disclosure shall be covered within the scope of the claims in the disclosure.

What is claimed is:

1. A mold for molding a glass product, comprising a lower mold and an upper mold cooperated with the lower mold, wherein the lower mold comprises a lower pressing surface provided close to the upper mold, and the upper mold comprises an upper pressing surface provided close to the lower pressing surface, wherein
    the upper pressing surface comprises a plurality of upper molding surfaces for molding the glass product and an upper mold closing surface connecting the plurality of upper molding surfaces; and
    the lower pressing surface comprises a plurality of lower molding surfaces for molding the glass product and a lower mold closing surface connecting the plurality of lower molding surfaces, wherein
    at least one of the upper mold closing surface or the lower mold closing surface comprises at least two mold closing regions sequentially arranged from center to outside, wherein the at least two mold closing regions comprise a central mold closing region at the center and at least one extending mold closing region extending outward from the central mold closing region, and the at least two mold closing regions have surface roughnesses increasing from the center to the outside.

2. The mold according to claim 1, wherein the central mold closing region has a circular shape, and each of the at least one extending mold closing region has a ring shape.

3. The mold according to claim 2, wherein an outermost extending mold closing region of the at least one extending mold closing region has a surface roughness ranging from 40 nm to 100 nm.

4. The mold according to claim 1, wherein the central mold closing region has a rectangular shape, and each of the at least one extending mold closing region has a rectangular-ring shape.

5. The mold according to claim 3, wherein each of the plurality of upper molding surfaces comprising an optical molding surface for molding an effective optical diameter and a structure molding surfaces surrounding the optical molding surface and each of the plurality of lower molding surfaces comprises an optical molding surface for molding an effective optical diameter and a structure molding surface surrounding the optical molding surface, wherein a surface roughness of a respective structure molding surface is equal to a surface roughness of a corresponding mold closing region connected to the respective structure molding surface.

6. The mold according to claim 3, wherein each of the plurality of upper molding surfaces comprises an optical molding surface for molding an effective optical diameter and a structure molding surface surrounding the optical molding surface, and each of the plurality of lower molding surfaces comprises an optical molding surface for molding an effective optical diameter and a structure molding surface surrounding the optical molding surface, wherein a surface roughness of a respective structure molding surface is less than a surface roughness of a corresponding mold closing region connected to the respective structure molding surface.

7. The mold according to claim 6, wherein the surface roughness of the respective structure molding surface is less than 20 nm.

8. The mold according to claim 4, wherein an outermost extending mold closing region of the at least one extending mold closing region has a surface roughness ranging from 40 nm to 100 nm.

9. The mold according to claim 8, wherein each of the plurality of upper molding surfaces comprises an optical molding surface for molding an effective optical diameter and a structure molding surface surrounding the optical molding surface, and each of the plurality of lower molding surfaces comprises an optical molding surface for molding an effective optical diameter and a structure molding surface surrounding the optical molding surface, wherein a surface roughness of a respective structure molding surface is less than a surface roughness of a corresponding mold closing region connected to the respective structure molding surface.

10. The mold according to claim 9, wherein the surface roughness of the respective structure molding surface is less than 20 nm.

11. The mold according to claim 8, wherein each of the plurality of upper molding surfaces comprises an optical molding surface for molding an effective optical diameter and a structure molding surfaces surrounding the optical molding surface, and each of the plurality of lower molding surfaces comprises an optical molding surface for molding an effective optical diameter and a structure molding surface surrounding the optical molding surface, wherein a surface roughness of a respective structure molding surface is equal to a surface roughness of a corresponding mold closing region connected to the respective structure molding surface.

12. The mold for molding a glass product according to claim 1, wherein a center of each of the at least one extending mold closing region is the same as a center of the central mold closing region.

\* \* \* \* \*